US012502328B1

(12) United States Patent
Raiszadeh

(10) Patent No.: US 12,502,328 B1
(45) Date of Patent: Dec. 23, 2025

(54) LUMBAR TRACTION SYSTEM

(71) Applicant: Kamshad Raiszadeh MD, a medical corporation, Rancho Santa Fe, CA (US)

(72) Inventor: Kamshad Raiszadeh, Rancho Santa Fe, CA (US)

(73) Assignee: Kamshad Raiszadeh MD, Rancho Santa Fe, CA (US)

( * ) Notice: Subject to any disclaimer, the term of this patent is extended or adjusted under 35 U.S.C. 154(b) by 0 days.

(21) Appl. No.: 19/069,835

(22) Filed: Mar. 4, 2025

(51) Int. Cl.
*A61H 1/00* (2006.01)
*A47C 16/00* (2006.01)
*A61H 1/02* (2006.01)

(52) U.S. Cl.
CPC ......... *A61H 1/0229* (2013.01); *A47C 16/005* (2013.01); *A61H 2201/0107* (2013.01); *A61H 2201/0165* (2013.01); *A61H 2201/0192* (2013.01); *A61H 2201/1207* (2013.01); *A61H 2201/1619* (2013.01); *A61H 2201/165* (2013.01); *A61H 2201/1654* (2013.01); *A61H 2201/1676* (2013.01); *A61H 2201/5007* (2013.01); *A61H 2203/0406* (2013.01); *A61H 2203/0431* (2013.01); *A61H 2230/625* (2013.01)

(58) Field of Classification Search
CPC .. A61H 1/0229; A61H 1/0218; A61H 1/0244; A61H 1/0292; A61F 5/02; A61F 5/022; A61F 5/024; A61F 5/026; A61F 5/028; A61F 5/03; A61F 5/042; A61F 5/048
USPC ........................................................... 602/36
See application file for complete search history.

(56) References Cited

U.S. PATENT DOCUMENTS 2,667,913 A * 2/1954 Dustin .................. B60N 2/787 297/252
2,778,358 A * 1/1957 Keles ...................... A61F 5/028 602/19
2,835,247 A * 5/1958 Stabholc ................. A61F 5/024 602/19
3,063,752 A * 11/1962 Moore ................. A61H 1/0292 5/81.1 R
4,030,489 A * 6/1977 Buckner ............. A61H 1/0218 602/5
4,080,962 A * 3/1978 Berkeley ................. A61F 5/024 602/19

(Continued)

FOREIGN PATENT DOCUMENTS

CN 101828983 9/2010
CN 103815995 5/2014

(Continued)

*Primary Examiner* — Adam Baker
(74) *Attorney, Agent, or Firm* — McNees Wallace & Nurick LLC

(57) ABSTRACT

In an exemplary embodiment, lumbar traction system for operating a bracing element is disclosed. The lumbar traction system includes a base, and a secondary frame and a primary frame. The secondary frame includes a head support for supporting a headrest pad, a torso support and a hip support, the torso and hip supports may be moveable with respect to each other, and a posterior brace, all of which may include a pad. The primary frame includes a knee-adjacent thigh brace and a media emplacement for supporting a bracing element.

19 Claims, 16 Drawing Sheets

(56) References Cited

U.S. PATENT DOCUMENTS

| | | | | |
|---|---|---|---|---|
| 4,545,370 | A * | 10/1985 | Welsh | A63B 23/0244 128/95.1 |
| 4,583,533 | A * | 4/1986 | Goodley | A61H 1/0292 482/904 |
| 4,881,528 | A | 11/1989 | Scott | |
| 5,224,924 | A * | 7/1993 | Urso | A61H 1/0222 135/73 |
| 6,315,750 | B1 | 11/2001 | Gray | |
| 7,036,168 | B1 * | 5/2006 | Knickerbocker | A61G 13/12 5/636 |
| 8,652,081 | B2 | 2/2014 | Rawlings | |
| 11,931,283 | B2 | 3/2024 | Leake et al. | |
| 2004/0097857 | A1 * | 5/2004 | Reinecke | A61F 5/024 602/19 |
| 2010/0168629 | A1 * | 7/2010 | Rao | A61F 5/028 602/19 |
| 2011/0021961 | A1 * | 1/2011 | Rawlings | A61F 5/024 602/19 |
| 2019/0117433 | A1 * | 4/2019 | Sacco | A61F 5/02 |

FOREIGN PATENT DOCUMENTS

| | | |
|---|---|---|
| CN | 112043483 | 12/2020 |
| KR | 200393967 | 8/2005 |
| KR | 101294556 | 7/2013 |
| KR | 1020180040944 | 4/2018 |

* cited by examiner

LUMBAR TRACTION SYSTEM

TECHNICAL FIELD

The present disclosure relates to an adjustable lumbar traction system. More specifically, the present disclosure is directed to an adjustable lumbar traction system for use with a bracing element, for example, a seating surface such a floor surface, a chair or bench seat, a chair or bench arm or other bracing rod (herein, a "support surface"), to direct fixed and opposing force between the bracing element and the adjustable lumbar traction system to achieve traction and distraction to the lumbar spine of a user.

BACKGROUND

Spinal traction is a non-surgical form of decompression therapy that relieves pressure on the spine. It can be performed manually or mechanically, and is used to treat herniated discs, sciatica, degenerative disc disease, pinched nerves, and other back conditions, and generically to relieve back pain. While it does have some potential side effects, spinal traction offers relief for most people since it decreases pressure on the discs, the most common cause of pain in the lumbar spine. Spinal traction involves applying a stretching force to the spine, for example, targeted at one or more of the cervical, thoracic or lumbar vertebrae, through body weight, weights, and/or pulleys to distract individual joints of the spine.

A variety of devices such as adjustable abdominal braces have been developed for spinal traction, which devices are variously problematic due to compression of the chest and abdomen which impairs normal breathing, compression of the lower abdomen which is uncomfortable and may adversely affect digestion and other internal organs and processes, pressure under the user's arms which can cause nerve impingement and pain. Also braces have the disadvantage of interfering with lower extremity function, with impingement of the brace during hip flexion and riding up and discomfort of the brace during sitting.

In view of the problems associated with known spinal traction solutions, there remains a need to provide a traction system that provides relief to users without interfering with daily and critical physiological functions.

According to the instant disclosure, the inventive lumbar traction system establishes the user in a comfortable and ergonomically favorable position directs the forces of distraction at the base of the ribs to effectively lift and distract the vertebrae, particularly of the lumbar spine, to provide relief while permitting normal breathing and arm and leg body motion with the exception of ambulation by foot.

SUMMARY

In various embodiments, the lumbar traction system is useful for providing generally linear traction and distraction of a user's lumbar spine to confer relief of tension.

In an embodiment the lumbar traction system comprises: a traction belt configured to encircle a user's torso below and in contact with a base of a rib cage of the user when the user has donned the lumbar traction system to provide anchorage for support of the user's upper body, and a plurality of length adjustable braces affixable to the traction belt and extending downward from the traction belt when the user has donned the lumbar traction system to deliver controlled upward force on the user's torso at the base of the user's ribcage and along a caudal to cranial axis of the user when the user is oriented in an upright position, each of the plurality of length adjustable braces comprising a support foot configured to fixedly contact a support substrate, and each of the plurality of length adjustable braces configured to be adjustably extended by the user and releasably locked in place between the traction belt and a contacted support substrate, wherein the lumbar traction system is configured to create lumbar spine traction while the user maintains an ergonomic posture permitting unimpeded breathing and use of the user's upper appendages. In various embodiments, when the lumbar traction system is donned and activated for use, the traction belt does not contact the user's lower abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion.

In some embodiments, each support foot of the plurality of length adjustable braces comprises a structure selected from the group consisting of a pivot base, a lateral clamp, an in-line clamp, or a distal in-line fork. In some such embodiments, the traction belt is adjustable in size, or is segmented and hinged to facilitate easy placement around the torso and removal after use, or includes a pad to ensure secure yet comfortable positioning around the torso, or a combination thereof. In some embodiments the braces are telescopically length adjustable to allow customization of the traction force and accommodate users of varying heights.

In some embodiments, the lumbar traction system comprises one or more of an integrated digital control panel for monitoring and adjusting traction levels in real time, at least one sensor to measure and provide feedback on the user's lumbar spine alignment during traction, shock-absorbing elements to reduce strain on the user during traction application, a built-in motorized system for automatic adjustment of the traction belt's elevation by adjustment of the length of the braces, allowing for dynamic traction based on user preference or physician recommendation, or a combination thereof.

In some embodiments, the length of each brace is selected to accommodate the user when seated upright or when standing upright.

In an embodiment, a method for applying lumbar traction to a user in an upright position using the lumbar traction system as described herein comprises: securing the traction belt below and in contact with a rib cage of a user; adjusting the position of the braces along the caudal to cranial axis of the user to achieve a desired contact of each brace with a support substrate; lengthening each brace to activating traction and establish a controlled separation between the user's torso and pelvis; monitoring alignment of the user along the caudal to cranial axis of the user; and adjusting the length of one or more of the braces as necessary to establish and maintain linear alignment of the user with the caudal to cranial axis of the user to optimize therapeutic effect of traction, wherein the traction belt does not contact the user's lower abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion. In some embodiments, the user is seated upright. In some embodiments, one or more braces may be oriented at an angle relative to the caudal to cranial axis of the user while oriented generally along such axis.

In an embodiment, the lumbar traction system provides lumbar traction to a user oriented in an upright position by directing force at a base of the user's ribcage and along a caudal to cranial axis of the user, comprising:

a traction belt comprising a closure, and a plurality of brace securement elements, the traction belt sized and shaped to rest in contact with the lower ribcage of the user without contacting the user's hips when the traction belt is donned and secured to the user;

a plurality of braces, each brace comprising a strut comprising:

at least two strut extensions comprising a proximal strut extension comprising a proximal engagement means; and a distal strut extension;

a support foot; and an adjustable extension lock engaged with each of the proximal strut extension and the distal strut extension, wherein each brace is connectable to the traction belt via connection of each proximal engagement means to a brace securement clip, wherein the adjustable extension lock is releasably engageable with each of the proximal strut extension and a distal strut extension, wherein the proximal strut extension and the distal strut extension are engageable to define a variable length of the strut by action of the adjustable extension lock.

In some embodiments, each brace securement element comprises a loop or flange.

In some embodiments, each proximal engagement means comprises a proximal in-line fork having fork arms.

In some embodiments, each distal strut extension comprises a modular foot receiver for releasable engagement of the support foot comprising a modular support foot.

In some embodiments, each the support foot comprises a modular support foot selected from a modular pivot base, a lateral clamp, an in-line clamp, or a distal in-line fork.

In some embodiments, the adjustable extension lock is selected from a ratchet lock, a lever lock, a clutch lock, a spring lock, or combinations thereof.

In some embodiments, each brace in the plurality of braces is length adjustable for use when the user is in an upright seated position.

In some embodiments, each brace in the plurality of braces is length adjustable for use when the user is in an upright standing position.

In some embodiments, each of the plurality of braces is oriented, when in use, along an axis that is transverse to the caudal to cranial axis of the user. In some embodiments, one or more braces may be oriented at an angle relative to the caudal to cranial axis of the user while oriented generally along such axis.

In some embodiments, one or more of the plurality of braces is oriented, when in use, along an axis that is transverse to the cranial-caudal axis of the user.

In various embodiments, the traction belt does not contact the user's lower abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion.

In an embodiment lumbar traction system for providing lumbar traction to a user oriented in an upright position by directing force at the base of the user's ribcage and along a caudal to cranial axis of the user, comprises:

a traction belt comprising a closure comprising an adjustable buckle, and a plurality of brace securement elements, each of the brace securement elements comprising a loop or a flange, the traction belt sized and shaped to rest in contact with the lower ribcage of the user without contacting the user's hips when the traction belt is donned and secured to the user; a plurality of braces, each brace comprising a strut comprising:

at least two strut extensions comprising a proximal strut extension comprising a proximal engagement means comprising a proximal in-line fork comprising fork arms; and a distal strut extension comprising a distal pin hole;

a support foot comprising a pivot base having brackets with aligned holes for receiving a pin passable through the aligned holes of the brackets and the distal pin hole of the distal strut extension to define a pivot joint; and an adjustable extension lock engaged with each of the proximal strut extension and the distal strut extension, the adjustable extension lock selected from a ratchet lock, a lever lock, a clutch lock, a spring lock, or combinations thereof, wherein each brace is connectable to the traction belt via connection of each proximal engagement means to a brace securement clip, and wherein the adjustable extension lock is releasably engageable with each of the proximal strut extension and a distal strut extension, and wherein the proximal strut extension and the distal strut extension are slidably engageable to define a variable length of the strut by action of the adjustable extension lock.

In some embodiments, the at least two strut extensions are cylindrical and engageable by insertion of the distal strut extension into the proximal strut extension and are length adjustable by slidable adjustment, and wherein the adjustable extension lock is a lever lock comprising a tube receiver portion and a lockable lever.

In an embodiment lumbar traction system for providing lumbar traction to a user oriented in an upright position by directing force at the base of the user's ribcage and along a caudal to cranial axis of the user, comprises:

a traction belt comprising a closure comprising an adjustable buckle, and a plurality of brace securement elements, each of the brace securement elements comprising a loop or a flange, the traction belt sized and shaped to rest in contact with the lower ribcage of the user without contacting the user's hips when the traction belt is donned and secured to the user;

a plurality of braces, each brace comprising a strut comprising:

at least two strut extensions comprising a proximal strut extension comprising a proximal engagement means comprising a proximal in-line fork comprising fork arms; and a distal strut extension comprising a modular foot receiver for releasable engagement of a modular support foot;

a support foot comprising a modular support foot selected from a modular pivot base, a lateral clamp, an in-line clamp, or an in-line fork; and an adjustable extension lock engaged with each of the proximal strut extension and the distal strut extension, wherein each brace is connectable to the traction belt via connection of each proximal engagement means to a brace securement clip, and wherein the adjustable extension lock is releasably engageable with each of the proximal strut extension and a distal strut extension, and wherein the proximal strut extension and the distal strut extension are slidably engageable to define a variable length of the strut by action of the adjustable extension lock.

In some embodiments, the at least two strut extensions are cylindrical and engageable by insertion of the distal strut extension into the proximal strut extension and are length adjustable by slidable adjustment.

In some embodiments, the adjustable extension lock is a lever lock comprising a tube receiver portion and a lockable lever.

In an embodiment a method for providing lumbar traction to a user oriented in an upright position by directing force at the base of the user's ribcage and along a caudal to cranial axis of the user, comprises:

(a) providing a lumbar traction system comprising:

a traction belt comprising a closure, and a plurality of brace securement elements, the traction belt sized and shaped to rest in contact with the lower ribcage of the user without contacting the user's hips when the traction belt is donned and secured to the user, a plurality of braces, each brace comprising a strut comprising at least two strut extensions comparison a proximal strut extension comprising a proximal engagement means;

a distal strut extension;

a support foot; and an adjustable extension lock engaged with each of the proximal strut extension and the distal strut extension, wherein each brace is connectable to the traction belt via connection of each proximal engagement means to a brace securement clip, wherein the adjustable extension lock is releasably engageable with each of the proximal strut extension and a distal strut extension, wherein the proximal strut extension and the distal strut extension are slidably engageable to define a variable length of the strut by action of the adjustable extension lock, and wherein the traction belt does not contact the user's lower abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion;

(b) establishing connection between the traction belt and the plurality of braces, comprising, in any order:

i. provisionally affixing the traction belt to a torso of the user, the traction belt positioned below the user's ribcage;

ii. positioning the user on a support surface in an upright position;

iii. provisionally securing the support foot of each brace;

iv. provisionally engaging the support foot of each brace in contact with the support surface; and v. actuating movement between the proximal strut extension and the distal strut extension to a selected length to roughly fit between the provisionally affixed traction belt and the support surface;

(c) securing the lumbar traction system into engagement to accomplish spinal distraction, comprising:

i. firmly securing the traction belt to the torso of the user ensuring contact of the traction belt at the base of at least a portion of the user's ribcage;

ii. adjusting the proximal strut extension and the distal strut extension to a length selected by the user and locking the adjustable extension lock.

Other features and advantages of the present invention will be apparent from the following more detailed description of the preferred embodiment which illustrates, by way of example, the principles of the invention.

Figure 1:
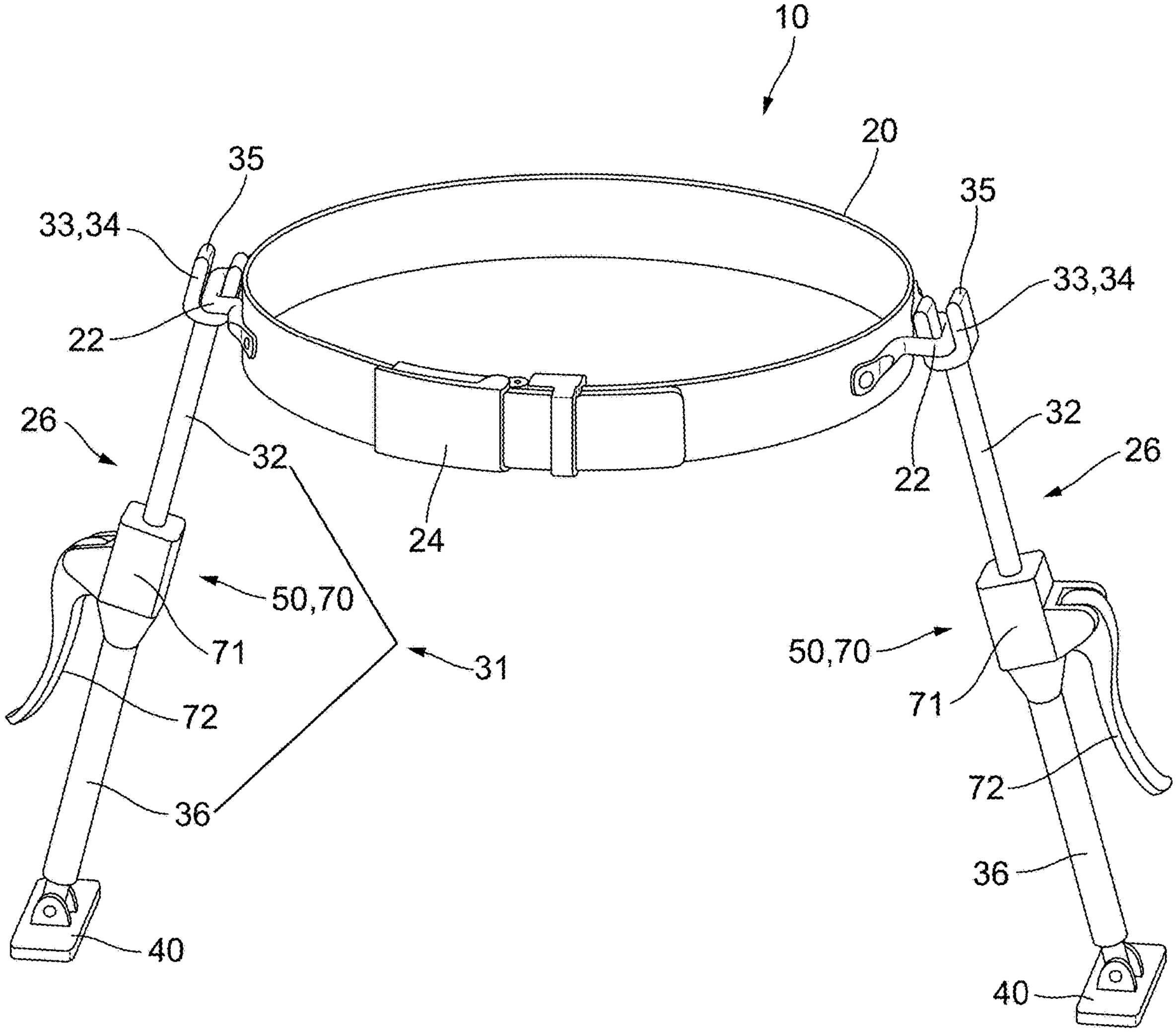
FIG. 1 is a perspective view of the lumbar traction system having two braces, according to an example embodiment of the present disclosure.

It should be noted that the drawings are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

| Parts Key | |
|---|---|
| 10 | Lumbar Traction System |
| 20 | Traction Belt |
| 22 | Brace securement elements, loop or flange |
| 24 | Closure, Buckle |
| 26 | Brace |
| 30 | Strut |
| 31 | Strut extensions |
| 32 | Proximal strut extension |
| 33 | Proximal engagement means |
| 34 | Proximal in-line fork |
| 35 | Proximal Fork arms |
| 36 | Distal strut extension |
| 37 | Modular foot receiver |
| 40 | Support foot |
| 41 | Pivot base |
| 42 | Pivot joint |
| 43 | Brackets |
| 44 | Aligned holes |
| 45 | Pin hole |
| 46 | Pin |
| 47 | Nut |
| 50 | Adjustable extension lock |
| 60 | Ratchet lock |
| 61 | Ratchet |
| 62 | Pawl/lever |
| 70 | Lever lock |
| 71 | Tube receivers |
| 72 | Lever |
| 80 | Clutch/cam lock |
| 81 | Knurled ring |
| 90 | Spring lock |
| 91 | Snap button |
| 92 | Button hole |
| 99 | Modular support foot |
| 100 | Modular foot adapter |
| 110 | Modular Pivot Base |
| 120 | Lateral clamp |
| 122 | Jaws |
| 124 | Locking screw |
| 130 | In-line clamp |
| 132 | Jaws |
| 134 | Locking screw |
| 140 | Distal in-line fork |
| 142 | Fork arms |
| 144 | Seat |

DETAILED DESCRIPTION

Nachemson and colleagues' studies conducted studies in 1964, 1965, and 1970. The measurements in these studies were taken in normal discs and included two levels (L3-4 and L4-5). All results showed that sitting induces a higher load on the lumbar spine than standing, by more than 20-40% in values. Compared with the pressure of load in the upright standing position, reclining reduces the pressure by 50-80%, while unsupported sitting increases the load by 40%, forward leaning and weight lifting by more than 100%, and the position of forward flexion and rotation by 400%. Later research noted the lowest pressure, approximately 20% of standing pressure was found with patients in supine position with only slightly higher pressure of approximately 22% for lying in the prone position. In contrast, for sitting relaxed without a backrest, intradiscal pressure has been measured at 90% of the value for standing. While these studies reveal that a prone or reclined position decreases pressure on discs and soft tissues as compared with seated and standing positions, it is not always feasible for a user to rest in a prone or reclined position. Also as disc degeneration progresses, there can be foraminal compression of the nerve. When traction is applied to the spine, the pressure on the spinal nerves exiting through the foramina (small openings between vertebra) is reduced, effectively lessening the compression on the nerve roots.

Accordingly, a solution is needed to provide traction to a user's spine while the user is seated or standing and confer relief that can immediately reduce the compression and associated intradiscal pressure and also address spinal issues including lumbar disc protrusion, disc herniation, sciatica, disc degeneration, or lumbar stenosis.

Specific Definitions

The term "lumbar traction system" described herein is a system for providing lumbar traction to a user oriented in an upright position by directing force through a traction belt oriented at the base of the user's ribcage and along a caudal to cranial axis of the user. The traction belt does not contact the user's lower abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion.

The term "upright" described herein is defined as sitting and leaning face down on the lumbar traction system ranging from an almost upright position to a more forward and flat position.

The term "proximal" as used in connection with any object refers to the portion of the object that is closest to the user or other operator of the object (or some other stated reference point), and the term "distal" refers to the portion of the object that is farthest from the user or operator of the object (or some other stated reference point). The term "user" means and refers to the individual using the object. In some embodiments, the term "proximal" refers to the upper portion of the object, for example oriented at a "cephalad," "cranial" and "superior" orientation direction toward the head relative to the "distal" portion of the object positioned in a "caudal," terms "caudad" or "inferior" direction toward the feet of the user. The term "operator" means and refers to any professional or paraprofessional who delivers clinical care to a medical user, particularly in connection with the delivery of care.

With respect to any references herein that may be made relative to a human user, the terms "cephalad," "cranial" and "superior" indicate a direction toward the head, and the terms "caudad" and "inferior" indicate a direction toward the feet. Likewise, the terms "dorsal" and "posterior" indicate a direction toward the back, and the terms "ventral" and "anterior" indicate a direction toward the front. And the term "lateral" indicates a direction toward a side of the user, the term "medial" indicates a direction toward the midline of the user, and away from the side, the term "ipsilateral" indicates a direction toward a side that is proximal to the operator or the object being referenced, and the term "contralateral" indicates a direction toward a side that is distal to the operator or the object being referenced. More generally, any and all terms providing spatial references to anatomical features shall have meaning that is customary in the art.

The term "support surface" as used herein is a counter force bracing element used for accomplishing the traction and distraction conferred by the adjustable lumbar traction system, the support surface selected from, for example, a seating surface such a floor surface, a chair, a stool, a bench seat or a bleacher seat, a chair or bench arm or other bracing rod (herein, a "support surface").

Lumbar Traction System

The lumbar traction system according to the present disclosure provides traction and distraction to the spine, particularly the lumbar spine, and upper torso support, while a user is positioned in an upright position. The lumbar traction system can be used in an upright position of the user selected from seated and standing. More specifically, the lumbar traction system directs distracting force at the base of the user's ribcage along a caudal to cranial axis of the user by opposition between the base of the user's ribcage and a support surface, including one more support surfaces. In various embodiments, the lumbar traction system is affixed to a user oriented in an upright position and accomplishes traction and distraction by directing force through a traction belt oriented at the base of the user's ribcage and along a caudal to cranial axis of the user. The traction belt rests under the ribs and therefore does not contact the user's abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion.

The lumbar traction system occupies a limited space around the user, specifically the region between the lower chest at and just below the lower portion of the ribs and terminates at either the hips/buttocks when the user is seated or laterally spaced relative to the user's fee when the user is standing, such that the lumbar traction system does not encumber excessive space around the user that would inhibit movement and in place use and exercise of the legs, arms, neck and head, thus, allowing the user to extend or flex one or both legs and operate manual equipment, computing devices, or otherwise exercise the upper body.

In some embodiments, the lumbar traction system includes an integral (dedicated) support foot, in some embodiments selected from the support foot options as disclosed herein. In some embodiments, the lumbar traction system includes a selection of modular support foot components that may be switched by a user via a modular foot adapter. Thus, the inventive lumbar traction system provides a wide range of adjustability to accommodate virtually any user's height, and girth, in a range of possible standing or sitting configurations.

In various embodiments, present lumbar traction system is lightweight and portable and can be easily assembled and disassembled for use virtually anywhere and by a wide range of users. In various embodiments, the lumbar traction system has a compact design and can be compactly maintained for easy storage. The lumbar traction system is ultra-simple to use and manufacture.

Advantageously, the disclosed inventive lumbar traction system, in various embodiments, provides mechanical and physiologic benefits that are not addressed by conventional lumbar traction devices known in the art, which devices are variously problematic due to compression of the chest which impairs normal breathing, compression of the lower abdomen which is uncomfortable and may adversely affect digestion and other processes, pressure under the user's arms which can cause nerve impingement and pain, and obstruction of the space around the user which can prevent leg movement and flexion and normal use of the upper body.

The teachings of the instant disclosure overcome deficiencies in the art. In particular, in some embodiments, the lumbar traction system establishes the user.

Lumbar Traction System:

Referring now to the drawings, FIGS. 1-3 and 6-9 represent various views and embodiments of the lumbar traction system.

Figure 7:
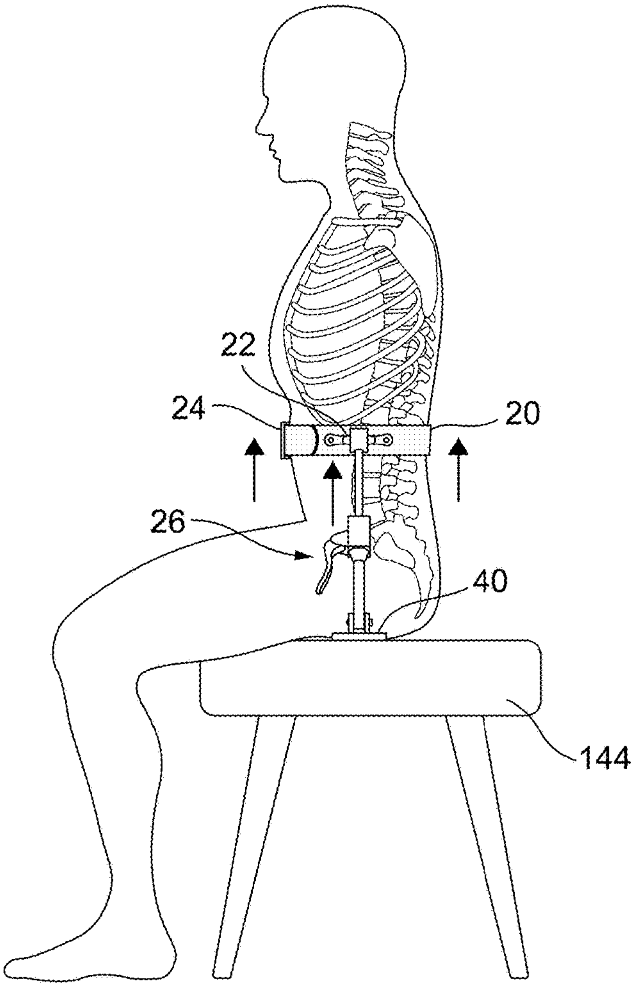
FIG. 7 is a side view of a graphic representation of a human in a second postural pose with the lumbar traction system rigidly affixed for use on the human user.

Referring specifically to FIG. 1, a perspective view of an adjustable lumbar traction system 10 in its operating position but not in the context of a user's body, is shown, and FIG. 7 the adjustable lumbar traction system is shown affixed to a user.

Figure 8:
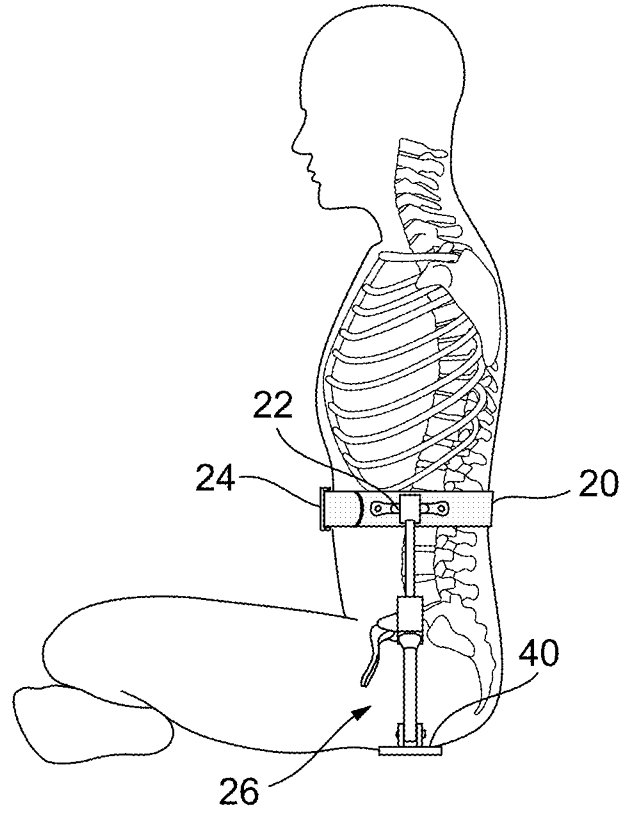
FIG. 8 is a side view of a graphic representation of a human in a third postural pose seated on a generic support surface, for example a floor, with the lumbar traction system rigidly affixed for use on the human user.
Figure 9:
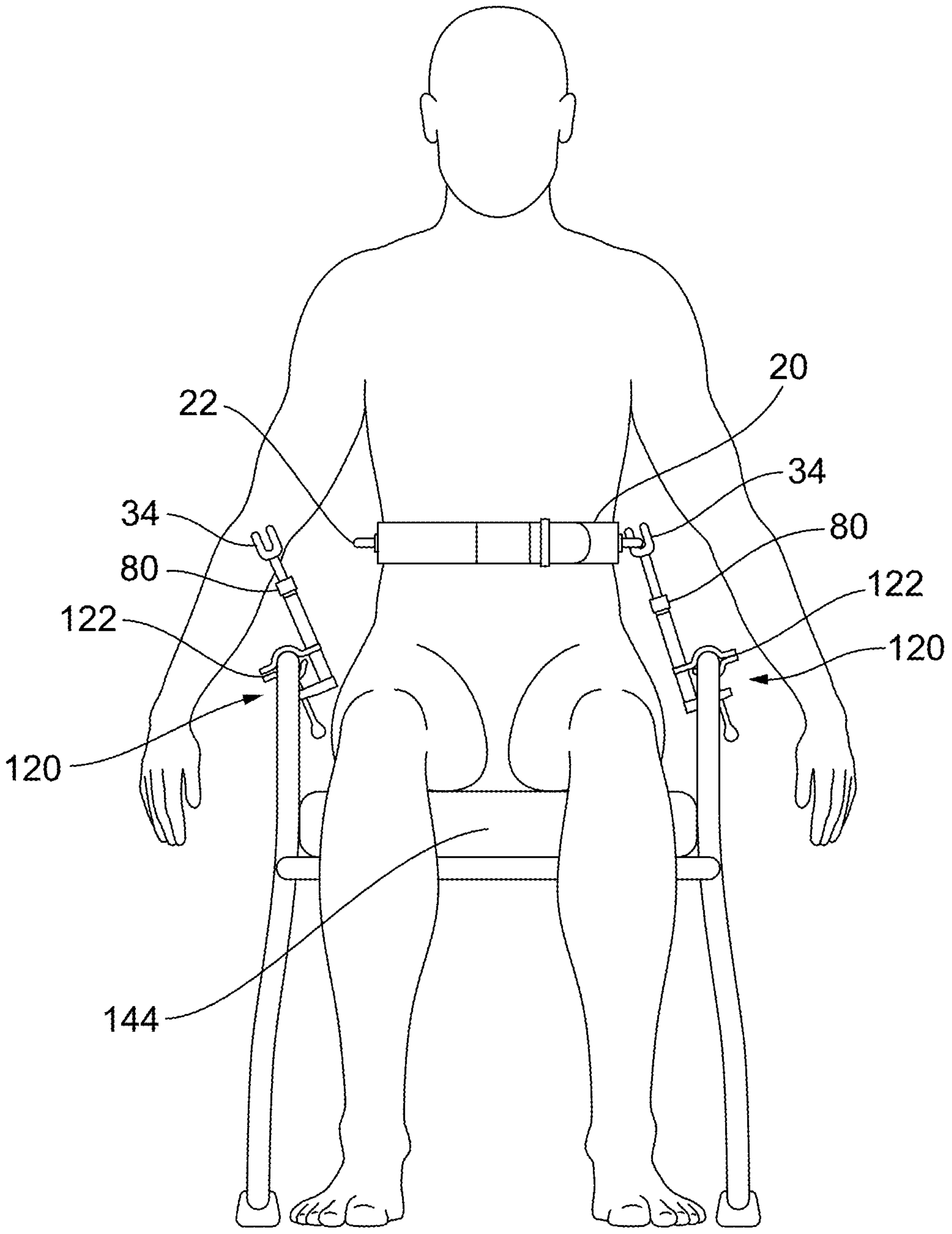
FIG. 9 is a is a front view of a graphic representation of a human in a postural pose seated on a chair type support surface, with the lumbar traction system rigidly provisionally in place relative to the human user and demonstrating engagement with the support surface using the modular support foot as shown in FIG. 2C and FIG. 10A, and the adjustable extension lock as shown in FIG. 4C.
Figure 10A:
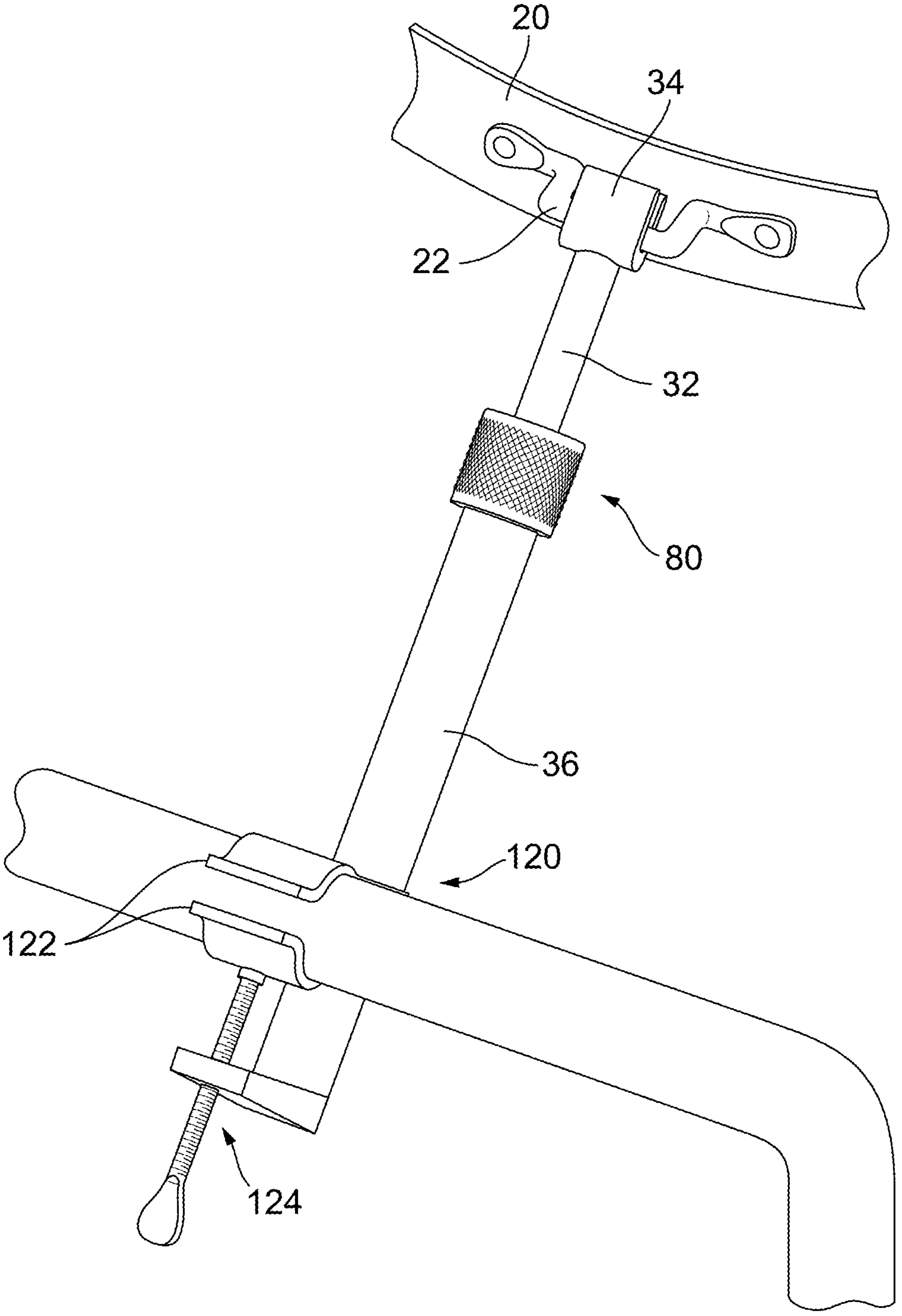
FIG. 10A is a side perspective view of the embodiment of a modular support foot shown in FIG. 2C depicted in attachment to a rail or chair arm.
Figure 10B:
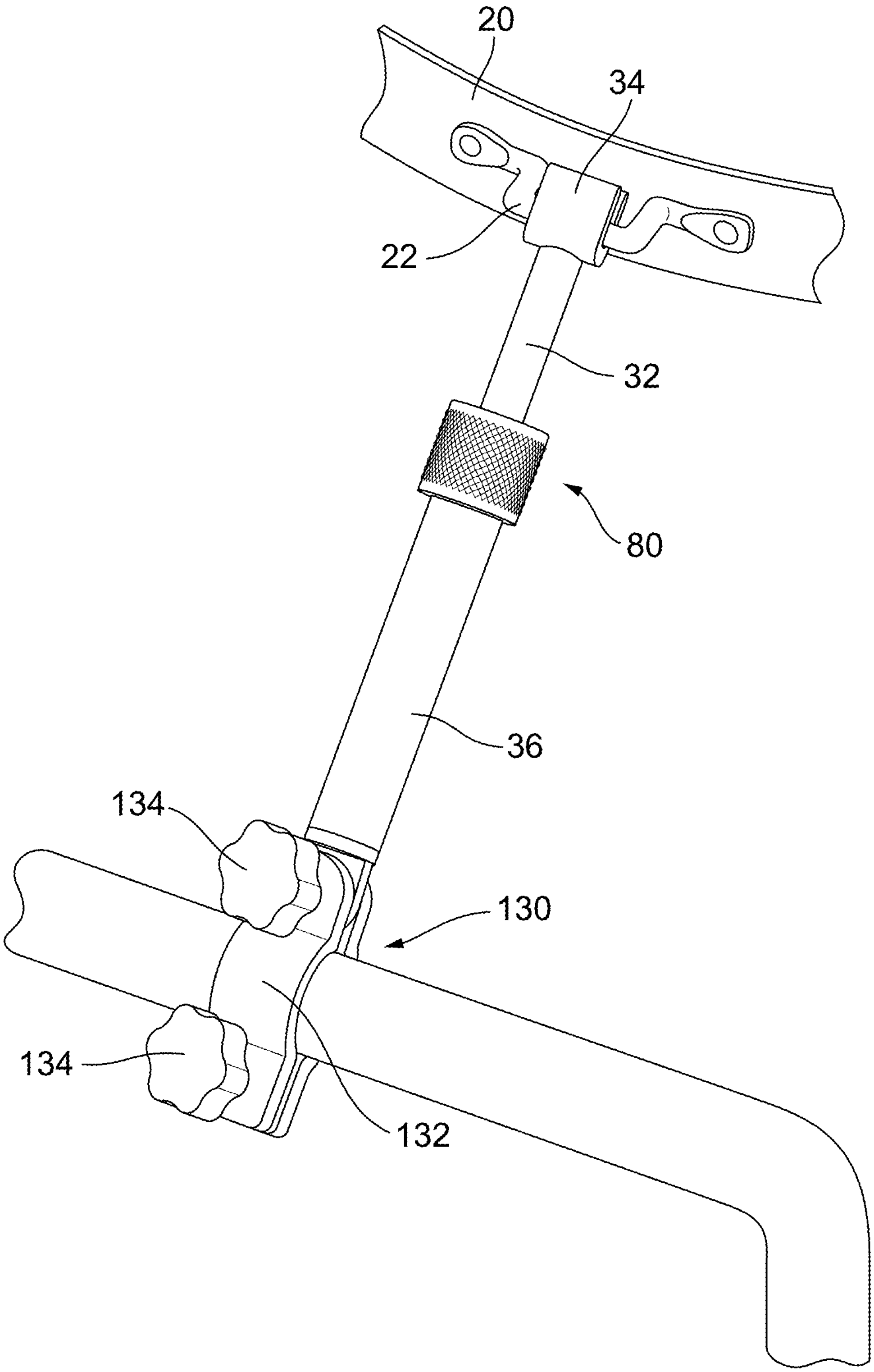
FIG. 10B is a side perspective view of the embodiment of a modular support foot shown in FIG. 2D depicted in attachment to a rail or chair arm.
Figure 10C:
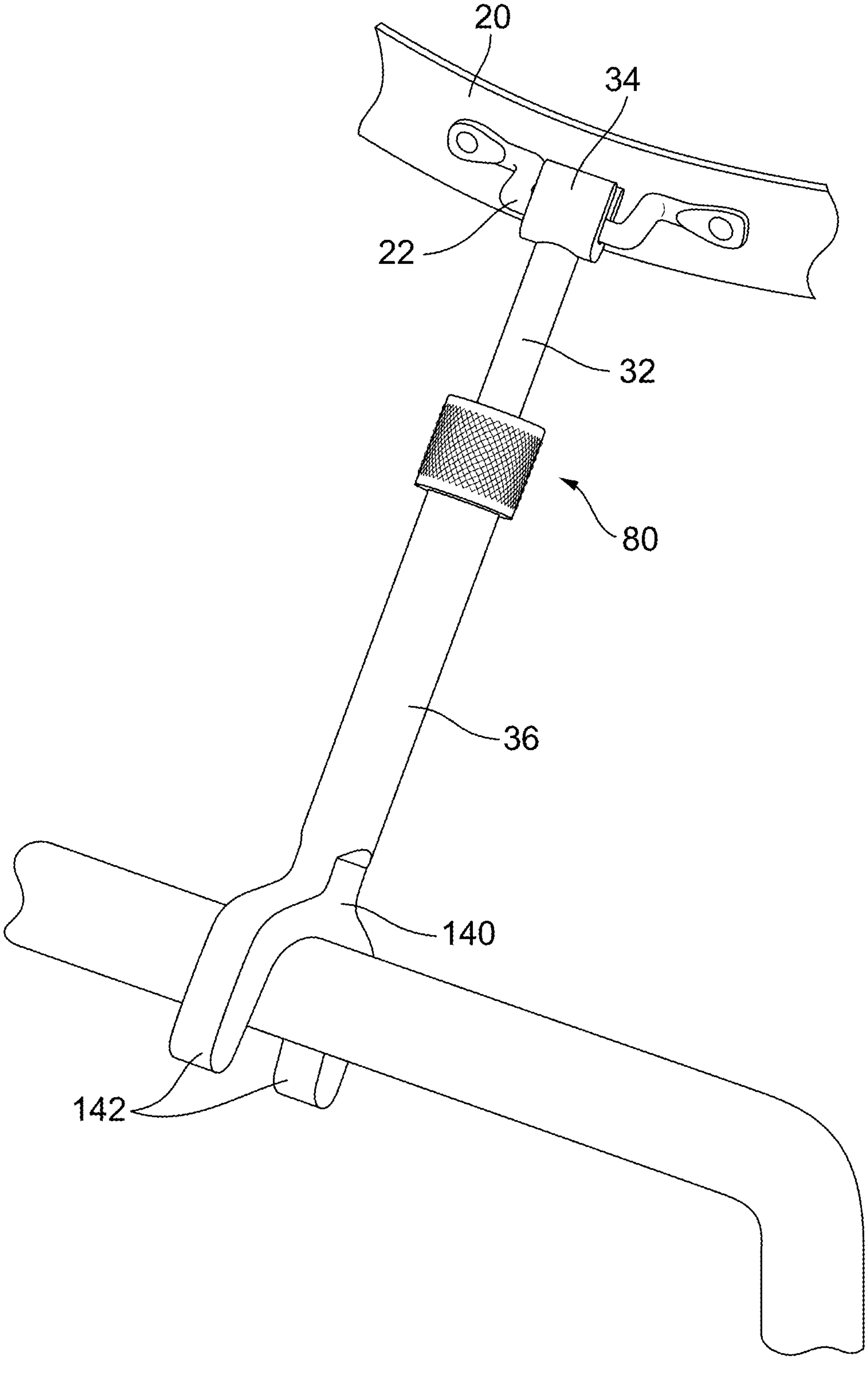
FIG. 10C is a side perspective view of the embodiment of a modular support foot shown in FIG. 2E depicted in attachment to a rail or chair arm.

In some embodiments, as shown in FIG. 1, the lumbar traction system 10 provides lumbar traction to a user oriented in an upright position by directing force at a base of the user's ribcage and along a caudal to cranial axis of the user. The lumbar traction system 10 includes a traction belt 20 comprising a closure 24, and a plurality of brace securement elements 22. The traction belt 20 is sized and shaped to rest in contact with the lower ribcage of the user without contacting the user's hips when the traction belt 20 is donned and secured to the user, as shown in FIG. 7-FIG. 9. In some embodiments, the closure 24 is an adjustable buckle 24, as shown in the various drawings, and the belt 20 has a length that permits adjustability and fixation within the buckle 24. Of course, it will be appreciated by one of ordinary skill in the art that other closure means are possible for accomplishing adjustability of a belt. Accordingly, the disclosed closure 24 as a buckle 24 is non limiting.

The lumbar traction system 10 includes a plurality of braces 26, each brace 26 comprising a strut 30 comprising at least two strut extensions 31. Each of the strut extensions 31 comprises a proximal strut extension 32 comprising a proximal engagement means 33, a distal strut extension 36, a support foot 40 and an adjustable extension lock 50 engaged with each of the proximal strut extension 32 and the distal strut extension 36. It will be appreciated that intervening or supplemental extending straight extensions may be employed as is customary in the art of telescoping tubes, so long as the proximal strut extension 32 and the distal strut extension 36 possess the requisite features for engagement with the traction belt 20 and engagement with the support surface. The proximal strut extension 32 and the distal strut extension 36 are engageable to define a variable length of the strut 30 by action of the adjustable extension lock 50. Each brace is connectable to the traction belt 20 via connection of each proximal engagement means 33 to a brace securement element 22. The adjustable extension lock 50 is releasably engageable with each of the proximal strut extension 32 and the distal strut extension 36, and the adjustable extension lock 50 is actuated to a locked configuration when the lumbar traction system is rigidly fixed to the user.

Referring again to FIG. 1, in various embodiments, each brace securement element 22 is adapted for engagement with the proximal engagement means 33. In some embodiments, each brace securement element 22 includes a loop or flange 22, and the proximal engagement means 33 comprises a proximal in-line fork 34 having fork arms 35. According to such embodiments, the fork arms 35 rest on opposing sides of the brace securement element 22, or at least one of the fork arms 35 passes through a looped brace securement element 22. In some embodiments, the proximal in-line fork 34 having fork arms 35 is substantially rectangularly "U" shaped but may alternatively be a curvilinear "U" shape or may be "V" shaped.

Figure 2A:
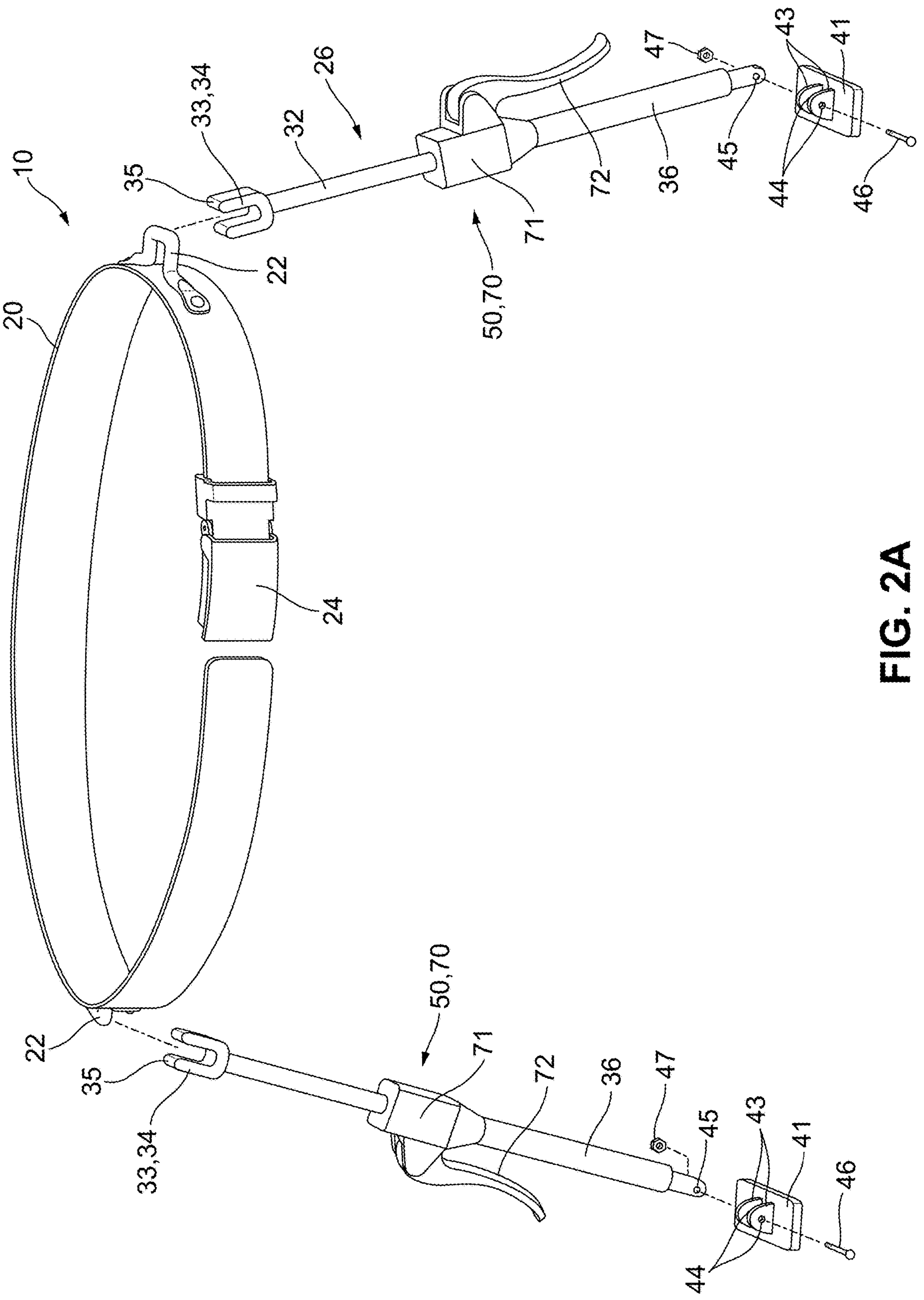
FIG. 2A is a front exploded perspective view of an embodiment of the lumbar traction system as shown in FIG. 1.
Figure 2C:
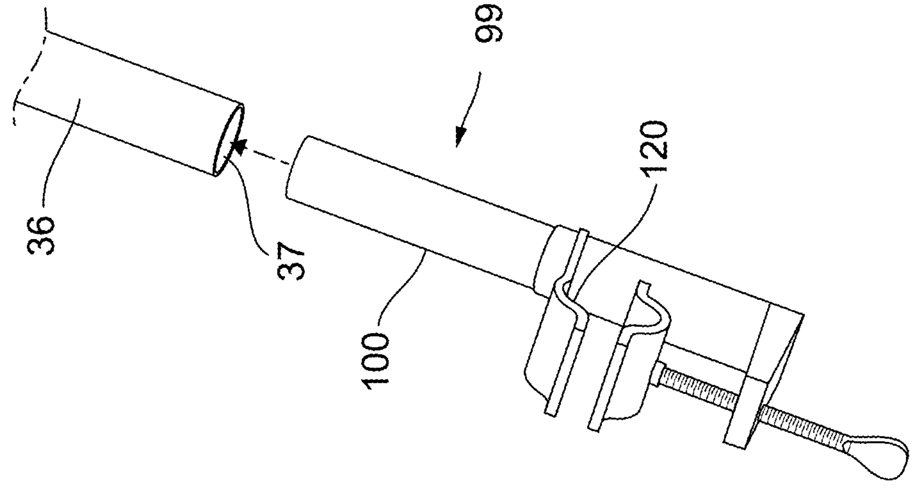
FIG. 2C is a side perspective view of another embodiment of a modular support foot.
Figure 2B:
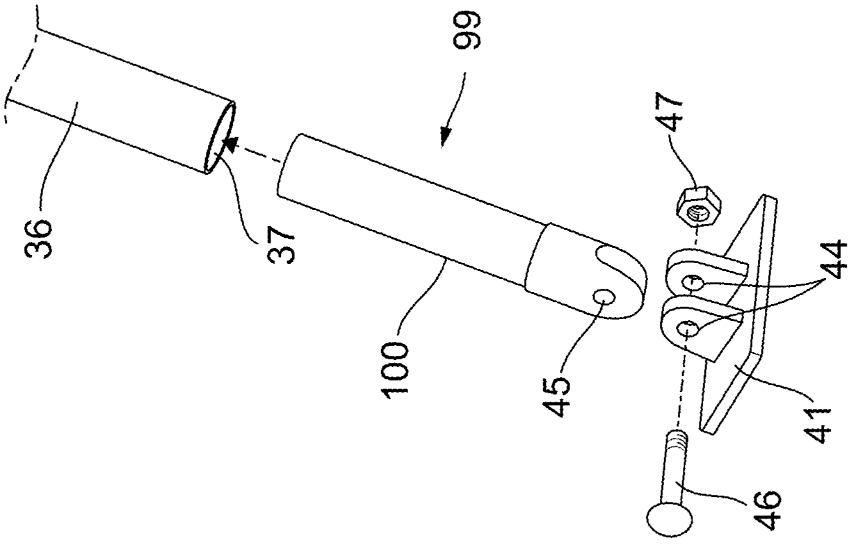
FIG. 2B is a side exploded perspective view of a modular embodiment of the support foot having a configuration as shown in FIG. 1.
Figure 2E:
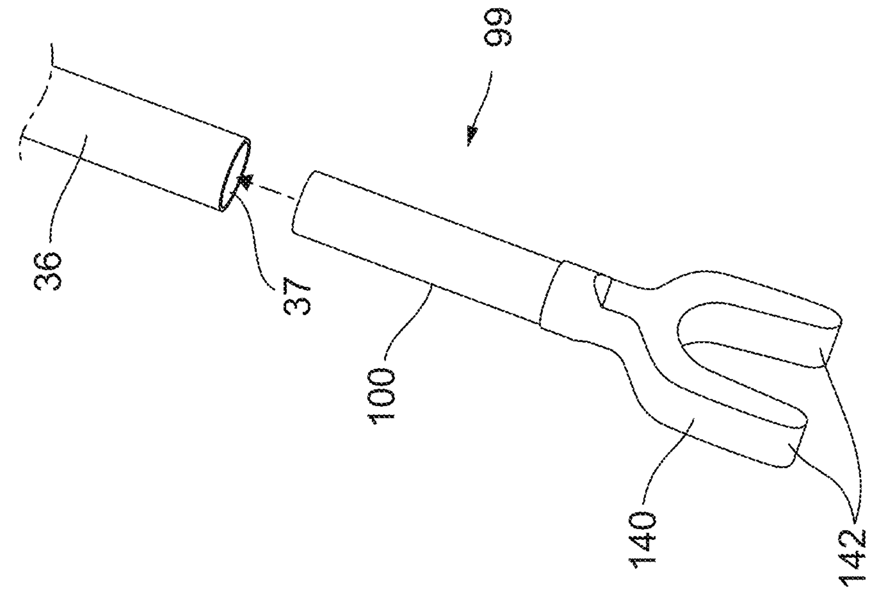
FIG. 2E is a side perspective view of another embodiment of a modular support foot.
Figure 2D:
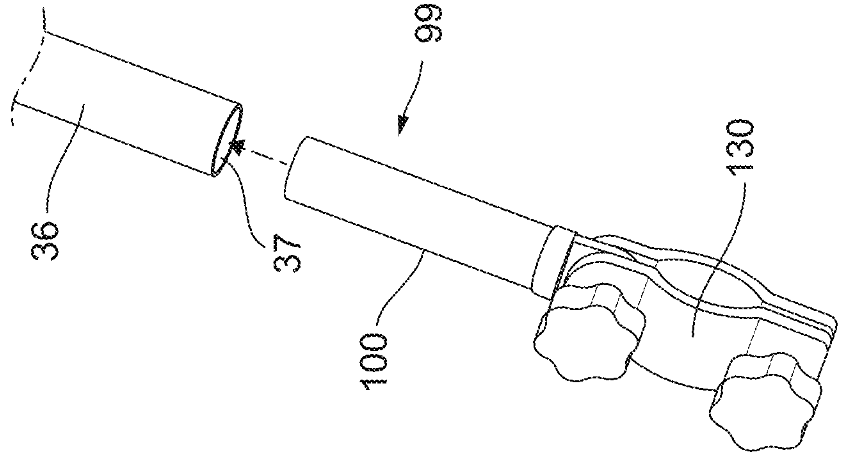
FIG. 2D is a side perspective view of another embodiment of a modular support foot.
Figure 3:
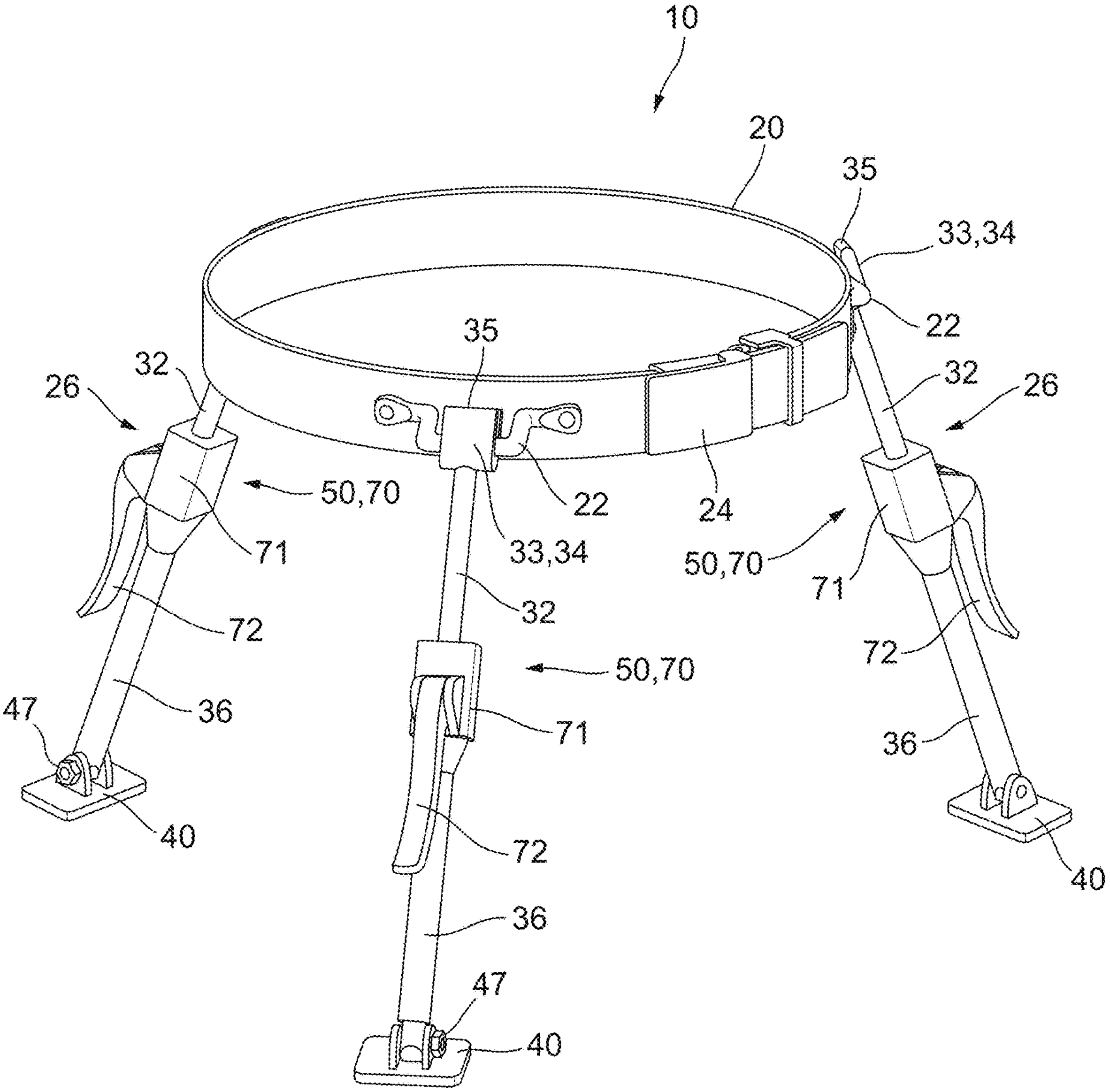
FIG. 3 is a side exploded perspective view of anther embodiment of the lumbar traction system having three braces.
Figure 4A:
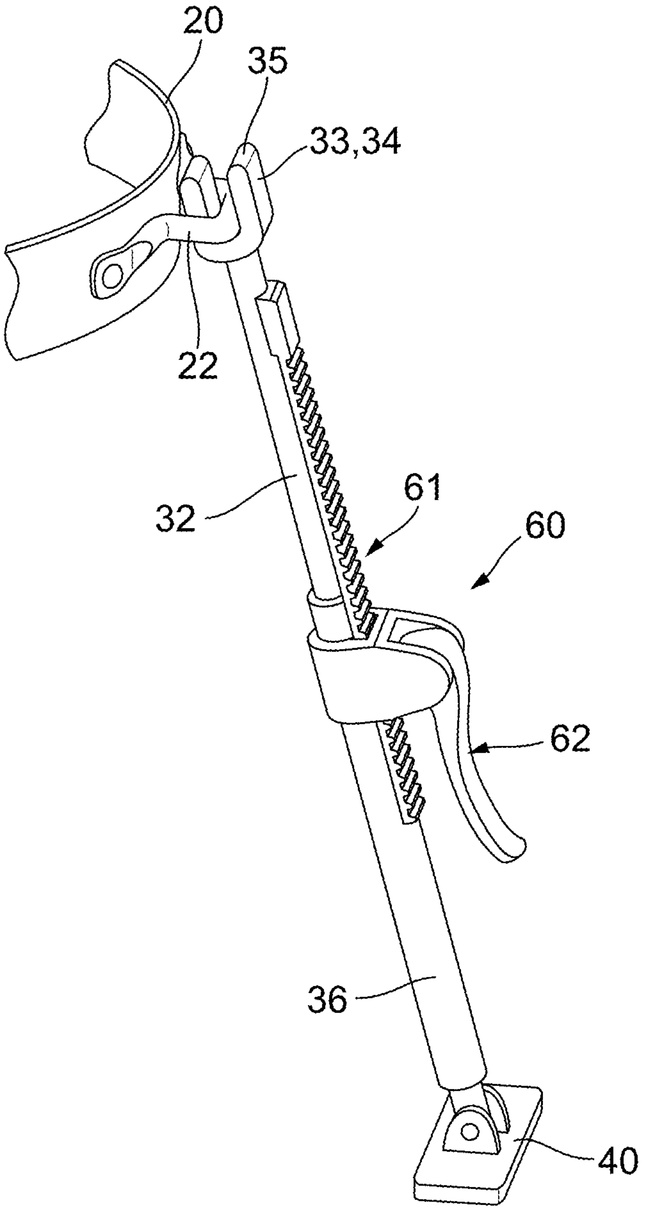
FIG. 4A is a side perspective view of an embodiment of the adjustable extension lock having a configuration that is different from what is shown in FIG. 1.
Figure 4B:
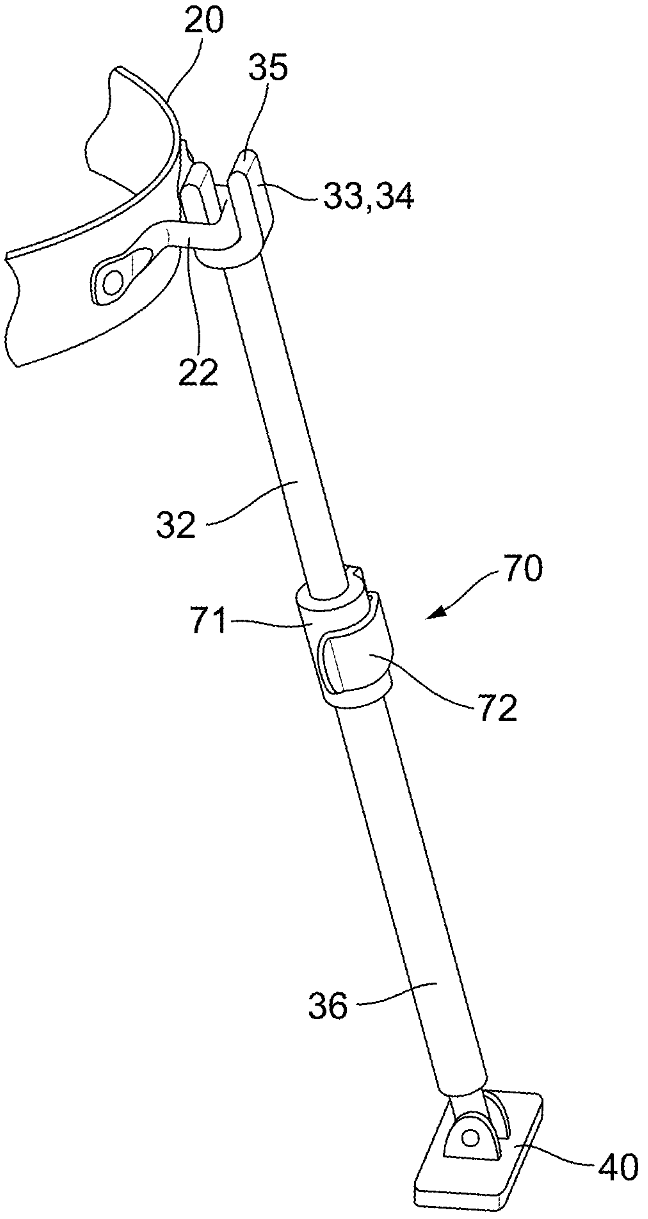
FIG. 4B is a side perspective view of another embodiment of the adjustable extension lock having a configuration that is different from what is shown in FIG. 1.
Figure 4C:
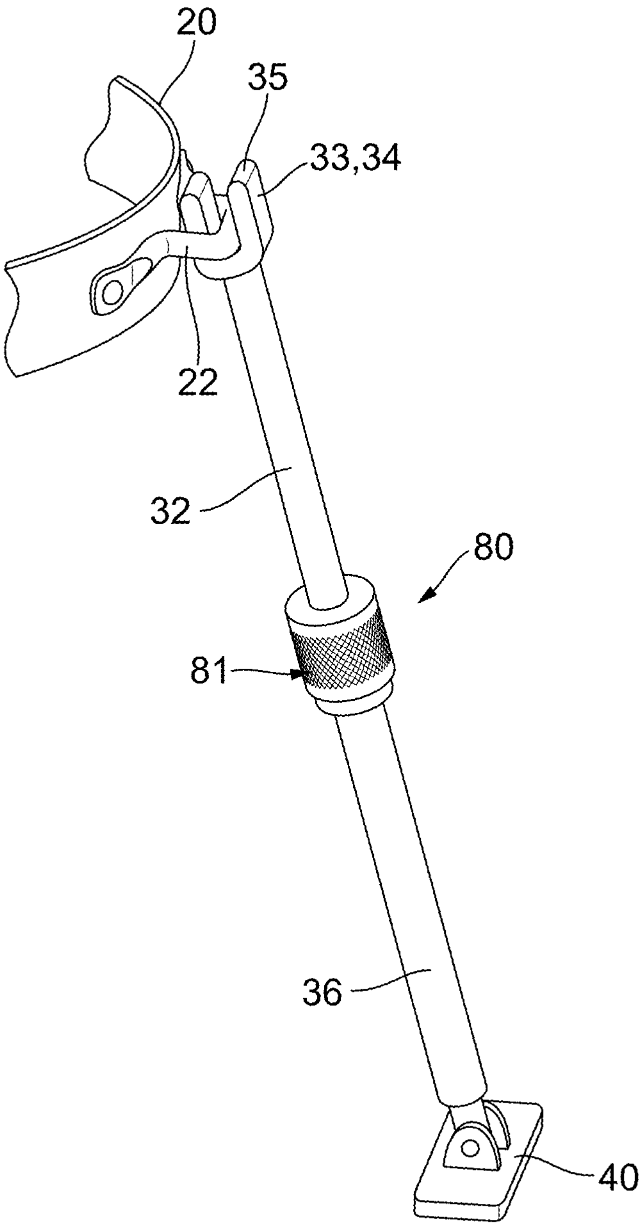
FIG. 4C is a side perspective view of another embodiment of the adjustable extension lock having a configuration that is different from what is shown in FIG. 1.
Figure 4D:
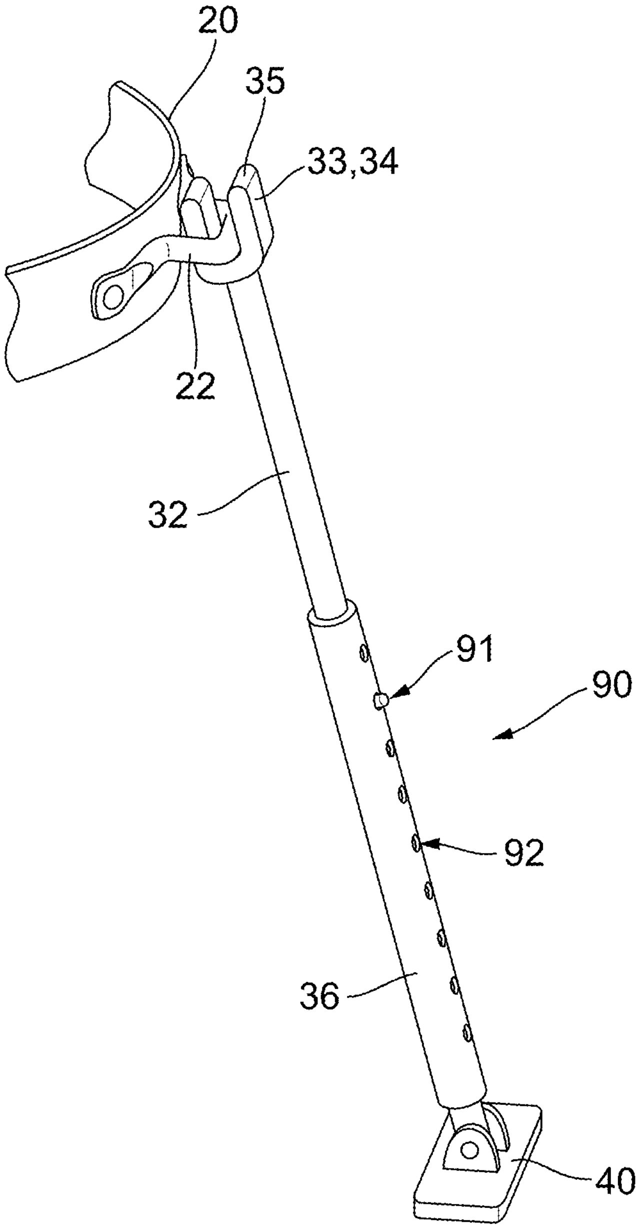
FIG. 4D is a side perspective view of another embodiment of the adjustable extension lock having a configuration that is different from what is shown in FIG. 1.
Figure 5:
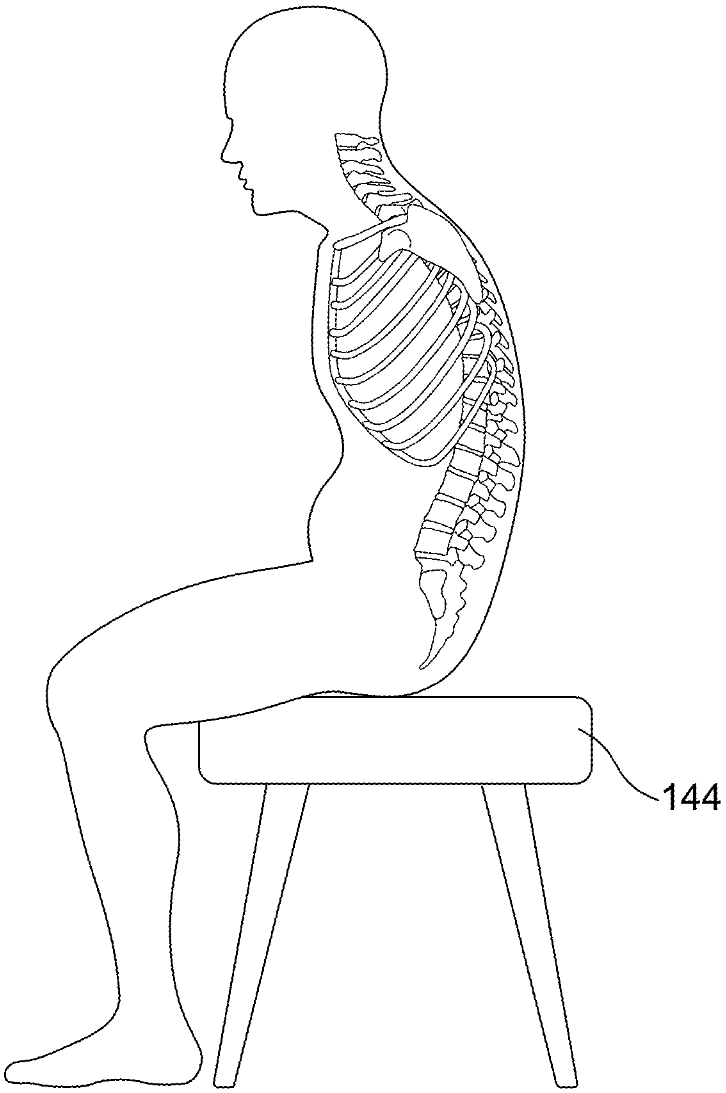
FIG. 5 is a side view of a graphic representation of a human in a first postural pose.
Figure 6:
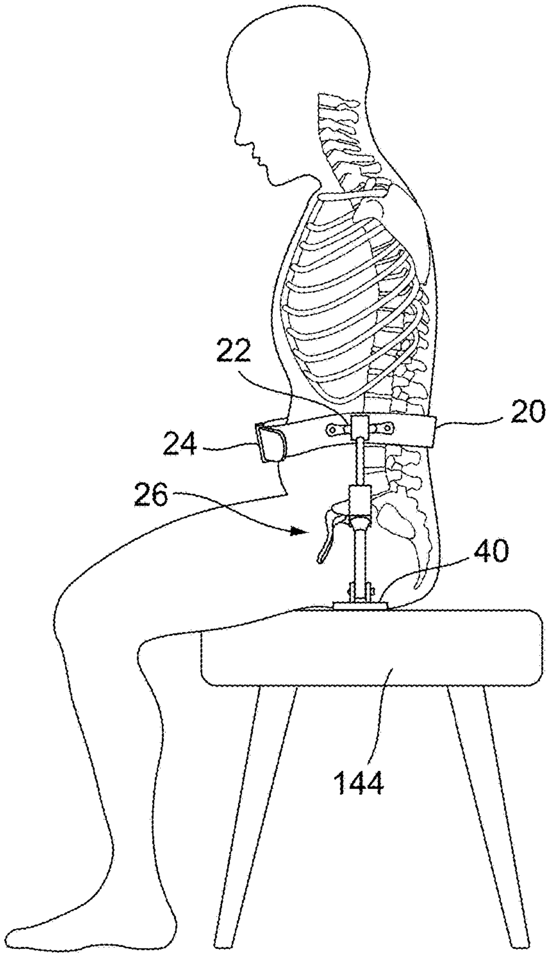
FIG. 6 is a side view of a graphic representation of a human in a second postural pose seated on a chair type support surface with the lumbar traction system provisionally in place relative to the human user.

Referring now to FIG. 2A the support foot 40 is dedicated/integral with the distal strut extension 36, and includes a pivot base 41 having brackets 43 with aligned holes 44 for receiving a pin 46 passable through the aligned holes 44 of the brackets 43, and the distal strut extension 36, includes a distal pin hole 45 for receiving the pin 46 to define a pivot joint 42. The depicted embodiment of the support foot 40 is enables moderate adjustability of the brace 26 for adapting to a support surface that is uneven or angled. As shown, the pin 46 may be locked in place with a nut 47. Of course, other means of fixation at the pivot joint 42 are possible, including spring clips and other fasteners known generally in the art.

Referring now to each of FIG. 2A-2E, the depicted embodiments of the lumbar traction system 10 are configured as modular to permit replacement or substitution of the support foot 40, wherein each of FIG. 2B-2E show alternate embodiments of a modular support foot 41 options. Referring now to the embodiment of FIG. 2B, the support foot 40 is adapted at a proximal portion of a modular foot adapter 100 to be insertable into a modular foot receiver 37 of the distal strut extension 36 to thereby releasably affix the modular support foot 99. Variously, in these alternate embodiments, the support foot 40 is selected from selected from a modular pivot base 110, a lateral clamp 120, an in-line clamp 130, or a distal in-line fork 140. Of course it will be appreciated by one skilled in the art that other features are suitable for providing as a support foot 40 and adapted to either rest on a support surface such as a floor or the earth or to be engaged with, grasp, clamp, or rest on a chair, stool, bench, bleacher or other seat or an arm thereof or a rod that may be fixed to or extend from a floor or the earth or to be engaged with, grasp, clamp, or rest on a chair, stool, bench, bleacher or other seat or an arm thereof.

Referring now to FIG. 4A-4D, in various embodiments the adjustable extension lock 50 may be selected from a ratchet lock 60, a lever lock 70, a clutch lock 80, a spring lock 90, or combinations thereof.

It will be appreciated that in various embodiments, each brace 26 in the plurality of braces 26 of the lumbar traction system 10 is length adjustable for use when the user is in an upright seated position, and each brace may be shortened or extended to accommodate the support surface on which it rests. In some embodiments, the support surface for each brace is the same, and in some embodiments, the support surface for each brace is different. For example, one brace may rest on the seat of a chair and the other on the floor. Other combinations are possible. In some embodiments, each brace 26 in the plurality of braces is length adjustable for use when the user is in an upright standing position.

In some embodiments, for example as shown in FIG. 1, each of the plurality of braces 26 is oriented, when in use, along an axis that is transverse to the caudal to cranial axis of the user.

In some embodiments, one or more of the plurality of braces 26, but not all, are oriented, when in use, along an axis that is transverse to the cranial-caudal axis of the user.

In various embodiments, as shown in the drawings, the traction belt 20 does not contact the user's lower abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion.

In a particular embodiment, the lumbar traction system 10 is adapted with dedicated support feet 40 for providing lumbar traction to a user oriented in an upright position by directing force at the base of the user's ribcage and along a caudal to cranial axis of the user. According to such embodiment, the lumbar traction system 10 includes a traction belt 20 comprising a closure 24 comprising an adjustable buckle 24, and a plurality of brace securement elements 22, each of the brace securement elements 22 comprising a loop or a flange, the traction belt 20 sized and shaped to rest in contact with the lower ribcage of the user without contacting the user's hips when the traction belt 20 is donned and secured to the user. According to such embodiment, the lumbar traction system 10 includes a plurality of braces 26, each brace comprising a strut 30 comprising at least two strut extensions 31 comprising, the at least two strut extensions comprising a proximal strut extension 32 comprising a proximal engagement means 33 comprising a proximal in-line fork 34 comprising fork arms 35; and a distal strut extension 36 comprising a distal pin hole 45, a support foot 40 comprising a pivot base 41 having brackets 43 with aligned holes 44 for receiving a pin 46 passable through the aligned holes 44 of the brackets 43 and the distal pin hole 45 of the distal strut extension 36 to define a pivot joint 42, and, an adjustable extension lock 50 engaged with each of the proximal strut extension 32 and the distal strut extension 36, the adjustable extension lock 50 selected from a ratchet lock 60, a lever lock 70, a clutch lock 80, a spring lock 90, or combinations thereof. According to such embodiment, each brace is connectable to the traction belt via connection of each proximal engagement means 33 to a brace securement element 22, and the adjustable extension lock 50 is releasably engageable with each of the proximal strut extension 32 and the distal strut extension 36, and the proximal strut extension 32 and the distal strut extension 36 are slidably engageable to define a variable length of the strut 30 by action of the adjustable extension lock 50.

Referring variously to the drawings, in some embodiments of the lumbar traction system according to claim 10, the at least two strut extensions 31 are cylindrical and engageable by insertion of the distal strut extension 36 into the proximal strut extension 32 and are length adjustable by slidable adjustment. According to some such embodiments, now referring to FIG. 1, the adjustable extension lock 50 is a lever lock 70 comprising a tube receiver portion and a lockable lever.

In another particular embodiment, the lumbar traction system 10 is adapted with modular support feet 99 for providing lumbar traction to a user oriented in an upright position by directing force at the base of the user's ribcage and along a caudal to cranial axis of the user. According to such embodiment, the lumbar traction system 10 includes a traction belt 20 comprising a closure 24 comprising an adjustable buckle 24, and a plurality of brace securement elements 22, each of the brace securement elements 22 comprising a loop or a flange, the traction belt 20 sized and shaped to rest in contact with the lower ribcage of the user without contacting the user's hips when the traction belt 20 is donned and secured to the user. According to such embodiment, the lumbar traction system 10 includes a plurality of braces 26, each brace comprising a strut 30 comprising at least two strut extensions 31, the at least two strut extensions 31 comprising a proximal strut extension 32 comprising a proximal engagement means 33 comprising a proximal in-line fork 34 comprising fork arms 35, and a distal strut extension 36 comprising a modular foot receiver 37 for releasable engagement of a modular support foot 99, a support foot 40 comprising a modular support foot 99 selected from a modular pivot base, a lateral clamp, an in-line clamp, or an in-line fork, and an adjustable extension lock 50 engaged with each of the proximal strut extension 32 and the distal strut extension 36. According to such embodiment, each brace is connectable to the traction belt via connection of each proximal engagement means 33 to a brace securement element 22, and the adjustable extension lock 50 is releasably engageable with each of the proximal strut extension 32 and the distal strut extension 36, and the proximal strut extension 32 and the distal strut extension 36 are slidably engageable to define a variable length of the strut 30 by action of the adjustable extension lock 50.

Referring variously to the drawings, in some embodiments of the lumbar traction system 10, the at least two strut extensions 31 are cylindrical and engageable by insertion of the distal strut extension 36 into the proximal strut extension 32 and are length adjustable by slidable adjustment.

According to some such embodiments, now referring to FIG. 1, the adjustable extension lock 50 is a lever lock 70 comprising a tube receiver portion and a lockable lever.

The disclosure provides a method for providing lumbar traction to a user oriented in an upright position by directing force at the base of the user's ribcage and along a caudal to cranial axis of the user.

The method includes the step of providing a lumbar traction system comprising a traction belt 20 comprising a closure 24, and a plurality of brace securement elements 22, the traction belt 20 sized and shaped to rest in contact with the lower ribcage of the user without contacting the user's hips when the traction belt 20 is donned and secured to the user, a plurality of braces 26, each brace comprising a strut 30 comprising at least two strut extensions 31 each comprising at least a proximal strut extension 32 comprising a proximal engagement means 33, a distal strut extension 36, at least one modular support foot 99, and an adjustable extension lock 50 engaged with each of the proximal strut extension 32 and the distal strut extension 36.

The provided lumbar traction system 10 is provided wherein each brace is connectable to the traction belt via connection of each proximal engagement means 33 to a brace securement element 22, wherein the adjustable extension lock 50 is releasably engageable with each of the proximal strut extension 32 and the distal strut extension 36.

And the provided lumbar traction system 10 is provided wherein the proximal strut extension 32 and the distal strut extension 36 are slidably engageable to define a variable length of the strut 30 by action of the adjustable extension lock 50.

And the provided lumbar traction system 10 is provided wherein the traction belt 20 does not contact the user's lower abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion.

The lumbar traction system 10 may be provided according to any one of the embodiment as disclosed herein.

The steps further include, establishing connection between the traction belt and the plurality of braces, comprising, in any order:

- Provisionally affixing the traction belt 20 to a torso of the user, the traction belt 20 positioned below the user's ribcage;
- Positioning the user on a support surface in an upright position;
- Provisionally securing the support foot of each brace in contact with the support surface;
- Provisionally engaging the support foot of each brace in contact with the support surface; and
- Actuating movement between the proximal strut extension 32 and the distal strut extension 36 to a selected length to roughly fit between the provisionally affixed traction belt and the support surface.

The steps further include, securing the lumbar traction system into engagement to accomplish spinal distraction, A contact of the traction belt 20 at the base of at least a portion of the user's ribcage; and Adjusting the proximal strut extension 32 and the distal strut extension 36 to a length selected by the user and locking the adjustable extension lock 50.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one," as used herein, means one or more and thus includes individual components as well as mixtures/combinations.

The transitional terms "comprising," "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim, and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as below. The device may be otherwise oriented (rotated 90 degrees or viewed or referenced at other orientations) and the spatially relative descriptors used herein should be interpreted accordingly.

Example embodiments are described herein with reference to illustrations that are schematic of possible embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A lumbar traction system comprising:

a traction belt configured to encircle a user's torso below a base of a rib cage of the user when the user has donned the lumbar traction system such that an upper surface of the traction belt is in contact with the base of the rib cage to provide anchorage for support of the user's upper body; and a plurality of length adjustable braces affixable to the traction belt and extending downward from the traction belt when the user has donned the lumbar traction system to deliver controlled upward force on the user's torso at the base of the user's rib cage and along a caudal to cranial axis of the user when the user is oriented in an upright position, each of the plurality of length adjustable braces comprising a support foot configured to fixedly contact a support substrate, and each of the plurality of length adjustable braces configured to be adjustably extended by the user and releasably locked in place between the traction belt and a contacted support substrate, wherein:

the lumbar traction system is configured to create lumbar spine traction while the user maintains an ergonomic posture permitting unimpeded breathing and use of the user's upper appendages; and the lumbar traction system is configured such that when the lumbar traction system is donned and activated for use, the traction belt does not contact the user's lower abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion.

2. The lumbar traction system according to claim 1, wherein each support foot of the plurality of length adjustable braces comprises a structure selected from the group consisting of a pivot base, a lateral clamp, an in-line clamp, or a distal in-line fork.

3. The lumbar traction system according to claim 1, wherein the traction belt is adjustable in size, or is segmented and hinged to facilitate easy placement around the torso and removal after use, or includes a pad to ensure secure yet comfortable positioning around the torso, or a combination thereof.

4. The lumbar traction system according to claim 1, wherein the braces are telescopically length adjustable to allow customization of the traction force and accommodate users of varying heights.

5. The lumbar traction system according to claim 1, comprising one or more of an integrated digital control panel for monitoring and adjusting traction levels in real time, at least one sensor to measure and provide feedback on the user's lumbar spine alignment during traction, shock-absorbing elements to reduce strain on the user during traction application, a built-in motorized system for automatic adjustment of the traction belt's elevation by adjustment of the length of the braces, allowing for dynamic traction based on user preference or physician recommendation, or a combination thereof.

6. The lumbar traction system according to claim 1, wherein the length of each brace is selected to accommodate the user when seated upright or when standing upright.

7. A method for applying lumbar traction to a user in an upright position using the lumbar traction system according to claim 1, comprising: securing the traction belt below and in contact with a rib cage of a user; adjusting the position of the braces along the caudal to cranial axis of the user to achieve a desired contact of each brace with a support substrate; lengthening each brace to activating traction and establish a controlled separation between the user's torso and pelvis; monitoring alignment of the user along the caudal to cranial axis of the user; and adjusting the length of one or more of the braces as necessary to establish and maintain linear alignment of the user with the caudal to cranial axis of the user to optimize therapeutic effect of traction, wherein the traction belt does not contact the user's lower abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion.

8. The method according to claim 7, wherein the user is seated upright.

9. A lumbar traction system for providing lumbar traction to a user oriented in an upright position by directing force at a base of the user's rib cage and along a caudal to cranial axis of the user, comprising:

a traction belt comprising:

a closure; and a plurality of brace securement elements, the traction belt sized and shaped such that an upper surface of the traction belt is in contact with the base of the rib cage without contacting the user's hips when the traction belt is donned and secured to the user; and a plurality of braces, each brace comprising a strut comprising:

at least two strut extensions comprising:

a proximal strut extension comprising a proximal engagement means;

a distal strut extension;

a support foot; and an adjustable extension lock engaged with each of the proximal strut extension and the distal strut extension, wherein:

each brace is connectable to the traction belt via connection of each proximal engagement means to a brace securement clip;

the adjustable extension lock is releasably engageable with each of the proximal strut extension and the distal strut extension; and the proximal strut extension and the distal strut extension are engageable to define a variable length of the strut by action of the adjustable extension lock, and wherein the traction belt does not contact the user's lower abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion.

10. The lumbar traction system according to claim 9, wherein the length of each brace is selected to accommodate the user when seated upright or when standing upright.

11. The lumbar traction system according to claim 9, each brace securement element comprising a loop or flange, and each proximal engagement means comprising a proximal in-line fork having fork arms.

12. The lumbar traction system according to claim 9, each distal strut extension comprising a modular foot receiver for releasable engagement of the support foot comprising a modular support foot, and each support foot comprising a modular support foot selected from a modular pivot base, a lateral clamp, an in-line clamp, or a distal in-line fork.

13. The lumbar traction system according to claim 12, the adjustable extension lock selected from a ratchet lock, a lever lock, a clutch lock, a spring lock, or combinations thereof, wherein at least one brace in the plurality of braces is length adjustable for use when the user is in an upright standing position, and wherein each of the plurality of braces is oriented, when in use, along an axis that is transverse to the caudal to cranial axis of the user.

14. The lumbar traction system according to claim 9, the traction belt comprising a closure comprising an adjustable buckle, each of the brace securement elements comprising a loop or a flange, each proximal strut extension comprising a proximal engagement means comprising a proximal in-line fork comprising fork arms; and each distal strut extension comprising a distal pin hole; each support foot comprising a pivot base having brackets with aligned holes for receiving a pin passable through the aligned holes of the brackets and the distal pin hole of the distal strut extension to define a pivot joint; and each adjustable extension lock engaged with each of the proximal strut extension and the distal strut extension selected from a ratchet lock, a lever lock, a clutch lock, a spring lock, or combinations thereof.

15. The lumbar traction system according to claim 14, wherein the at least two strut extensions are cylindrical and engageable by insertion of one of the at least two strut extension into the other of the at least two strut extensions and are length adjustable by slidable adjustment, and wherein the adjustable extension lock is a lever lock comprising a tube receiver portion and a lockable lever.

16. The lumbar traction system according to claim 9, the traction belt comprising a closure comprising an adjustable buckle, each of the brace securement elements comprising a loop or a flange, each proximal strut extension comprising a proximal engagement means comprising a proximal in-line fork comprising fork arms; and each distal strut extension a modular foot receiver for releasable engagement of a modular support foot; each support foot comprising a modular support foot selected from a modular pivot base, a lateral clamp, an in-line clamp, or an in-line fork, and each adjustable extension lock engaged with each of the proximal strut extension and the distal strut extension selected from a ratchet lock, a lever lock, a clutch lock, a spring lock, or combinations thereof.

17. The lumbar traction system according to claim 16, wherein the at least two strut extensions are cylindrical and engageable by insertion of one of the at least two strut extension into the other of the at least two strut extensions and are length adjustable by slidable adjustment, and wherein the adjustable extension lock is a lever lock comprising a tube receiver portion and a lockable lever.

18. A method for providing lumbar traction to a user oriented in an upright position by directing force at the base of the user's rib cage and along a caudal to cranial axis of the user, comprising:

(a) providing a lumbar traction system comprising:

a traction belt comprising:

a closure; and a plurality of brace securement elements, the traction belt sized and shaped such that an upper surface of the traction belt is in contact with the base of the rib cage without contacting the user's hips when the traction belt is donned and secured to the user;

a plurality of braces, each brace comprising a strut comprising:

at least two strut extensions, comprising;

a proximal strut extension comprising a proximal engagement means;

a distal strut extension;

a support foot; and an adjustable extension lock engaged with each of the proximal strut extension and the distal strut extension, wherein:

each brace is connectable to the traction belt via connection of each proximal engagement means to a brace securement clip;

the adjustable extension lock is releasably engageable with each of the proximal strut extension and the distal strut extension;

the proximal strut extension and the distal strut extension are slidably engageable to define a variable length of the strut by action of the adjustable extension lock; and the traction belt does not contact the user's lower abdomen or belly or the user's chest or upper rib cage thereby enabling natural breathing without compression of the lungs or other vital organs, and does not contact or interfere with the user's arms or armpits, thereby avoiding shoulder hunching and possible impingement of arm musculature and nerves, and maximizing natural arm and shoulder motion;

(b) establishing connection between the traction belt and the plurality of braces, comprising, in any order:

i. provisionally affixing the traction belt to a torso of the user, the traction belt positioned below the user's rib cage;

ii. positioning the user on a support surface in an upright position;

iii. provisionally securing the support foot of each brace;

iv. provisionally engaging the support foot of each brace in contact with the support surface; and v. actuating movement between the proximal strut extension and the distal strut extension to a selected length to roughly fit between the provisionally affixed traction belt and the support surface; and (c) securing the lumbar traction system into engagement to accomplish spinal distraction, comprising:

i. firmly securing the traction belt to the torso of the user ensuring contact of the traction belt at the base of at least a portion of the user's rib cage; and ii. adjusting the proximal strut extension and the distal strut extension to a length selected by the user and locking the adjustable extension lock.

19. The method according to claim 18, wherein the user is seated upright.

* * * * *